(12) United States Patent
Amato et al.

(10) Patent No.: US 12,379,993 B2
(45) Date of Patent: *Aug. 5, 2025

(54) MEMORY BANK PROTECTION

(71) Applicant: Micron Technology, Inc., Boise, ID (US)

(72) Inventors: Paolo Amato, Treviglio (IT); Marco Sforzin, Cernusco sul Naviglio (IT); Daniele Balluchi, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,954

(22) Filed: May 10, 2024

(65) Prior Publication Data
US 2024/0296094 A1 Sep. 5, 2024

Related U.S. Application Data

(63) Continuation of application No. 17/752,538, filed on May 24, 2022, now Pat. No. 11,994,946.

(60) Provisional application No. 63/193,976, filed on May 27, 2021.

(51) Int. Cl.
G06F 11/10 (2006.01)
G06F 11/07 (2006.01)

(52) U.S. Cl.
CPC ........ *G06F 11/1068* (2013.01); *G06F 11/076* (2013.01); *G06F 11/0772* (2013.01); *G06F 11/1004* (2013.01)

(58) Field of Classification Search
None
See application file for complete search history.

(56) References Cited

U.S. PATENT DOCUMENTS

| | | | |
|---|---|---|---|
| 7,188,296 B1 * | 3/2007 | Cypher | H03M 13/2906 714/755 |
| 9,116,832 B2 | 8/2015 | Grube et al. | |
| 10,613,934 B2 | 4/2020 | Kalos et al. | |
| 10,922,172 B2 | 2/2021 | Margetts | |
| 2004/0003336 A1 * | 1/2004 | Cypher | G11C 29/42 714/763 |
| 2004/0003337 A1 * | 1/2004 | Cypher | G11C 29/42 714/763 |
| 2011/0289368 A1 * | 11/2011 | Daga | H03M 13/2906 714/E11.034 |
| 2015/0331732 A1 * | 11/2015 | Giovannini | G11C 11/406 714/704 |
| 2019/0205206 A1 * | 7/2019 | Hornung | G06F 11/108 |
| 2019/0258540 A1 * | 8/2019 | Sharon | G06F 11/1048 |
| 2020/0243154 A1 * | 7/2020 | Sity | G06F 11/1068 |
| 2021/0200630 A1 * | 7/2021 | Ishikawa | G06F 11/1068 |

(Continued)

*Primary Examiner* — Daniel F. McMahon
(74) *Attorney, Agent, or Firm* — Brooks, Cameron & Huebsch, PLLC

(57) ABSTRACT

Systems, apparatuses, and methods related to memory bank protection are described. A quantity of errors within a single memory bank is determined and the determined quantity can be used to further determine whether to access other memory banks to correct the determined quantity. The memory bank protection described herein avoids a single memory bank of a memory die being a single point of failure (SPOF).

19 Claims, 5 Drawing Sheets

(56) References Cited

U.S. PATENT DOCUMENTS

2022/0164297 A1\* 5/2022 Sity ................ G06F 3/0637
2022/0237077 A1\* 7/2022 Brewer ............ G06F 11/1048

\* cited by examiner

631 →

┌─────────────────────────────────────────────────────────────────┐
│ PERFORMING A READ OPERATION ON A BANK OF A GROUP OF MEMORY BANKS│
│ OF A MEMORY DIE TO RETRIEVE FIRST HOST DATA FROM A PAGE OF      │ — 632
│ MEMORY CELLS OF THE BANK OF THE GROUP AND ERROR DETECTION DATA  │
│ FROM A DIFFERENT PAGE OF MEMORY CELLS OF THE BANK OF THE GROUP  │
└─────────────────────────────────────────────────────────────────┘

┌─────────────────────────────────────────────────────────────────┐
│         PERFORMING AN ERROR DETECTION OPERATION ON              │
│   THE FIRST HOST DATA RETRIEVED FROM THE PAGE OF MEMORY CELLS   │ — 634
│         OF THE GROUP USING THE ERROR DETECTION DATA             │
└─────────────────────────────────────────────────────────────────┘

┌─────────────────────────────────────────────────────────────────┐
│      RESPONSIVE TO DETERMINATION OF A QUANTITY OF ERRORS        │
│   EXCEEDING A THRESHOLD QUANTITY WITHIN THE FIRST HOST DATA VIA │
│  THE ERROR DETECTION OPERATION, READING SECOND HOST DATA FROM   │ — 636
│   CORRESPONDING PAGES OF MEMORY CELLS OF OTHER MEMORY BANKS OF  │
│   THE GROUP AND ERROR CORRECTION DATA STORED IN AT LEAST ONE    │
│            OF THE OTHER MEMORY BANKS OF THE GROUP               │
└─────────────────────────────────────────────────────────────────┘

┌─────────────────────────────────────────────────────────────────┐
│ PERFORMING AN ERROR CORRECTION OPERATION USING THE SECOND HOST  │
│  DATA RETRIEVED FROM THE CORRESPONDING PAGES OF MEMORY CELLS OF │
│  THE OTHER MEMORY BANKS AND THE ERROR CORRECTION DATA RETRIEVED │ — 638
│    FROM THE AT LEAST ONE OF THE OTHER MEMORY BANKS OF THE GROUP │
│         TO CORRECT THE QUANTITY OF ERRORS EXCEEDING             │
│                    THE THRESHOLD QUANTITY                       │
└─────────────────────────────────────────────────────────────────┘

*FIG. 6*

MEMORY BANK PROTECTION

PRIORITY INFORMATION

This application is a Continuation of U.S. application Ser. No. 17/752,538, filed on May 24, 2022, which claims the benefit of U.S. Provisional Application No. 63/193,976, filed on May 27, 2021, the contents of which are incorporated herein by reference.

TECHNICAL FIELD

The present disclosure relates generally to semiconductor memory and methods, and more particularly, to apparatuses, systems, and methods for memory bank protection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

BRIEF DESCRIPTION OF THE DRAWINGS

FIG. 6 is a flow diagram representing an example method for memory bank protection in accordance with a number of embodiments of the present disclosure.

DETAILED DESCRIPTION

Figure 1:
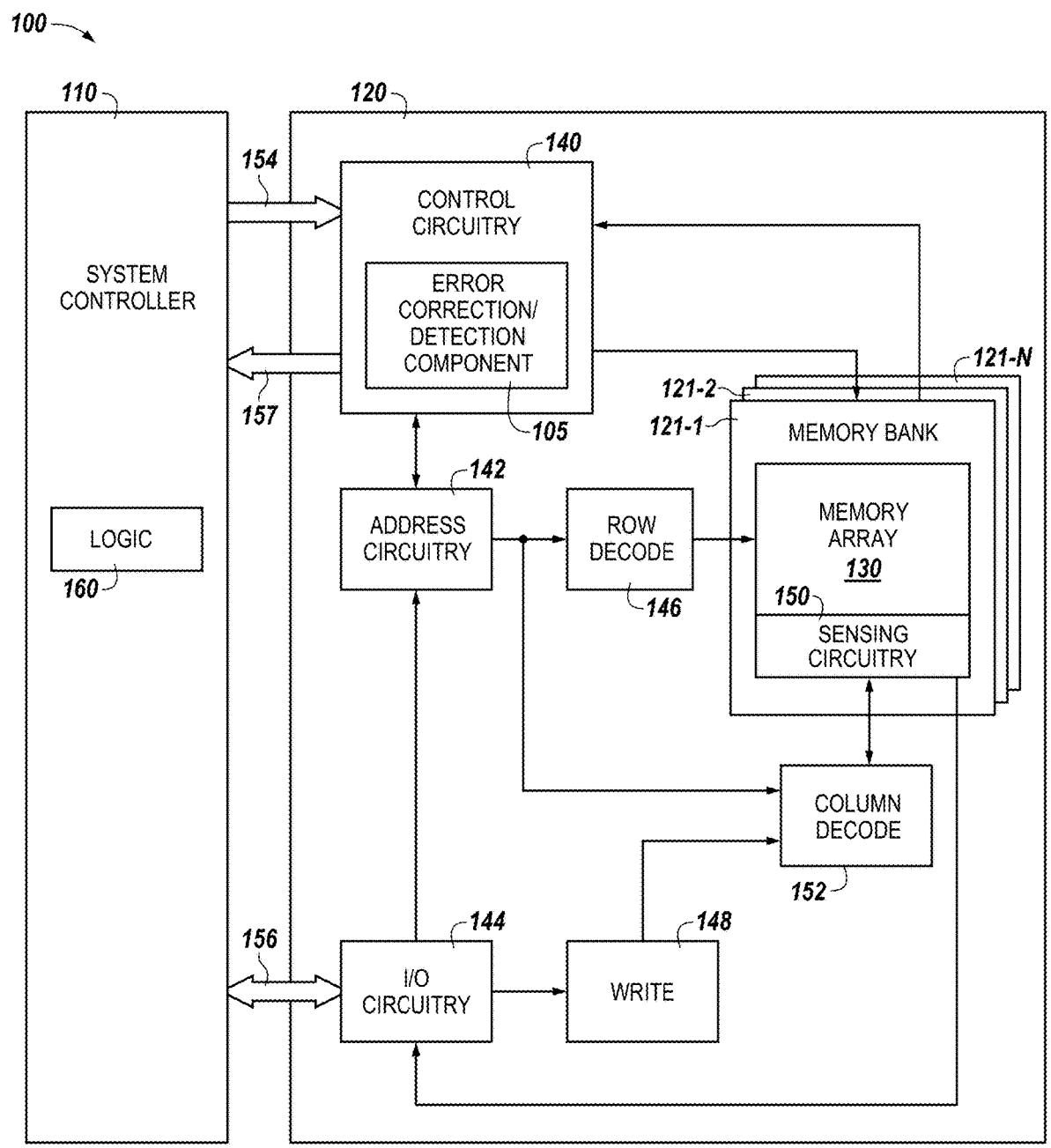
FIG. 1 is a block diagram of an apparatus in the form of a computing system including a host and a memory device in accordance with a number of embodiments of the present disclosure.

Systems, apparatuses, and methods related to memory bank protection are described. Data protection and recovery schemes are often an important aspect of RAS (Reliability, Availability, and Serviceability) associated with memory systems. Such schemes may provide a "chip kill" capability, in which the memory system can work properly even if a constituent chip, such as a memory die, is damaged; thereby, avoiding a situation of one of the chips being a single point of failure (SPOF) of the memory system. Often, the chip kill capability is provided through a "Redundant Array of Independent Disks" (RAID) scheme, which allow data recovery of the damaged chip by reading all of the constituent chips of the memory system.

Such a RAID scheme providing the chip kill capability; however, may incur unnecessary latencies when implemented in a memory system where a failure frequently occurs in particular memory location of a smaller granularity than a die-level. For example, a memory die (e.g., DRAM die) that includes multiple banks of memory cells typically experiences a failure in a single constituent bank. Therefore, the chip kill capability that prevents a single memory die from being a SPOF will treat a failure of the single bank as if it were a failure of the die, which will trigger reading of multiple dice each time a single bank is failed.

In contrast, embodiments described herein are directed to providing a memory bank protection scheme that avoids each constituent memory bank from being a SPOF of a memory die. Therefore, the memory bank protection scheme provided by the embodiments of the present disclosure avoids instances where all memory dice of a memory system need to be read for data recovery of a failed bank unless a particular die is completely damaged (e.g., non-functional), which will increase overall performance of the memory system. Various embodiments of the present disclosure can provide benefits such as reduced overhead as compared to prior RAS schemes since a single bank can be used for parity data (e.g., RAID parity) rather than an entire die such as in some prior "chip kill" approaches. Also, in some embodiments, the parity stripe used to protect the banks is within a single die; therefore the operations related to the parity scheme (e.g., read, write, and recovery in the case of a fail) involve a single die on a single channel, which can provide simpler management as compared to RAID recovery schemes operating across multiple dice and/or channels. Also, since various embodiments involve a single die, the bank recovery mechanism (e.g., CRC+RAID) can be implemented on-die as opposed to via a controller external to the die.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (e.g., having the potential to, being able to), not in a mandatory sense (e.g., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 221 may reference element "21" in FIG. 2, and a similar element may be referenced as 321 in FIG. 3. A group or plurality of similar elements or components may generally be referred to herein with a single element number. For example, a plurality of reference elements 221-1 to 221-M may be referred to generally as 221. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a block diagram of an apparatus in the form of a computing system 100 including a system controller 110 and a memory device 120 in accordance with a number of embodiments of the present disclosure. As used herein, a memory device 120, control circuitry 140, memory banks 121-1, 121-2, . . . , 121-N, and/or memory array 130 might also be separately considered an "apparatus."

The system controller 110 is coupled (e.g., connected) to the memory device 120. The system controller 110 can be an external controller such as a memory controller of a memory sub-system such as a dual in-line memory module (DIMM) or a solid state drive (SSD), for example. In embodiments in which the system controller 110 is a memory controller of a memory sub-system, the memory controller 110 can be coupled to one or more processors (e.g., a CPU).

The system controller 110 can include logic circuitry (e.g., logic 160) that can be utilized to generate ECC data based on data received from the host. The logic circuitry 160 can be operated based on various types of error correction/detection data, such as Hamming codes, Reed-Solomon (RS) codes, Bose-Chaudhuri-Hochquenghem (BCH) codes, circular redundancy check (CRC) codes, Golay codes, Reed-Muller codes, Goppa codes, and Denniston codes, among others. Error correction/detection data generated using the error correction/detection component 105 can be written to multiple dice (e.g., memory die 120) as further described/illustrated in connection with FIG. 5.

In various embodiments, the system controller 110 can be further coupled to a host system (not illustrated in FIG. 1) such as a personal laptop computer, a desktop computer, a digital camera, a smart phone, a memory card reader, and/or internet-of-thing enabled device, among various other types of hosts. The host can include a system motherboard and/or backplane and can include a number of processing resources (e.g., one or more processors, microprocessors, or some other type of controlling circuitry). The system 100 can include separate integrated circuits or the host, the system controller 110 and the memory device 120 can be on the same integrated circuit. The system 100 can be, for instance, a server system and/or a high performance computing (HPC) system and/or a portion thereof.

The memory device 120 (e.g., memory die) can include a number of memory banks 121-1, 121-2, . . . , 121-N (e.g., collectively referred to as memory banks 121) that can include a memory array 130 including multiple rows and columns of storage units and sensing circuitry 150. Although a single memory device 120 is shown if FIG. 1, the system controller 110 can be coupled to multiple memory devices (e.g., dice) 120 over multiple channels. Further, although not illustrated in FIG. 1, each one of the memory banks 121 can include control circuitry (e.g., a bank processor) to control and/or orchestrate performance of memory operations in response to instructions received from the control circuitry 140. In some embodiments, each one of the memory banks 121 can be addressed separately, for example, by the control circuitry 140.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, among other types of arrays. The array 130 can include memory cells arranged in rows coupled by access lines (which may be referred to herein as word lines or select lines) and columns coupled by sense lines (which may be referred to herein as data lines or digit lines).

As shown in FIG. 1, the memory device 120 can include address circuitry 142 to latch address signals provided over a combined data/address bus 156 (e.g., an external I/O bus connected to the system controller 110) by I/O circuitry 144, which can include an internal I/O bus. The internal I/O bus can transfer data between memory banks and I/O pins (e.g., DRAM DQs), for example.

The memory device 120 can include address circuitry 142 to latch address signals for data provided over an input/output "I/O" bus 156 (e.g., data bus and/or address bus) through I/O circuitry 144 (e.g., provided to external ALU circuitry and to DRAM DQs via local I/O lines and global I/O lines). Address signals are received through address circuitry 142 and decoded by a row decoder 146 and a column decoder 152 to access the memory array 130. Data can be read from the memory array 130 by sensing voltage and/or current changes on sense lines (digit lines) using the sensing circuitry 150. The sensing circuitry 150 can read and latch a page (e.g., row) of data from the memory array 130. The I/O circuitry 144 can be used for bi-directional data communication with system controller 110 over the data bus 156 (e.g., a 64 bit wide data bus). The write circuitry 148 can be used to write data to the memory array 130.

The control circuitry 140 (e.g., bank control logic and sequencer) can decode signals (e.g., commands) provided by control bus 154 from the system controller 110. These signals can include chip enable signals, write enable signals, and/or address latch signals that can be used to control operations performed on the memory array 130, including data sense, data store, data movement (e.g., copying, transferring, and/or transporting data values), data write, and/or data erase operations, among other operations. In various embodiments, the control circuitry 140 can be responsible for executing instructions from the system controller 110 and accessing the memory array 130. The control circuitry 140 can be a state machine, a sequencer, or some other type of controller.

The control circuitry 140 can further include an error correction/detection component 105 and utilize the error correction/detection component 105 to generate ECC data based on data received from the host and/or the system controller 110. The error correction/detection component 107 can be operated based on various types of error correction/detection data, such as Hamming codes, Reed-Solomon (RS) codes, Bose-Chaudhuri-Hochquenghem (BCH) codes, circular redundancy check (CRC) codes, Golay codes, Reed-Muller codes, Goppa codes, and Denniston codes, among others. Error correction/detection data generated using the error correction/detection component 105 can be written to the memory bank(s) 121 in various manners as further described/illustrated in connection with FIGS. 2-6.

The error correction/detection component 105 of the control circuitry 140 can be configured to perform an error correction/detection operation using error correction/detection data stored in the memory array 130. The error correction/detection operation performed by using the error correction/detection component 105 can provide multi-level error correction/detection capability on errors within the memory array 130. For example, a first level (of the multi-level) of error correction/detection capability can be provided using error correction data stored in one memory bank (e.g., memory bank 121) to correct a quantity of errors equal to or not exceeding a threshold quantity and using error detection data stored in the same memory bank for indication of whether there are still remaining errors within the same memory bank even subsequent to the error correction operation (e.g., first error correction operation) previously performed. A second level (of the multi-level) of error correction/detection capability can be provided in the event that it is indicated that there are still errors even subsequent to the error correction operation previously performed. The second level of error correction/detection capability can be provided by performing another error correction operation (e.g., second error correction operation) using error correction data stored in a dedicated memory bank and/or portion of a memory bank.

In some embodiments, a first error correction operation (e.g., performed to provide the first level of error correction capability) and a second error correction operation (e.g., performed to provide the second level of error correction capability) can be performed at different processing resources. For example, the first error correction operation can be performed at a respective bank processor, while the second error correction operation can be performed at a system processor/controller, such as the control circuitry 140.

Figures 2, 3:
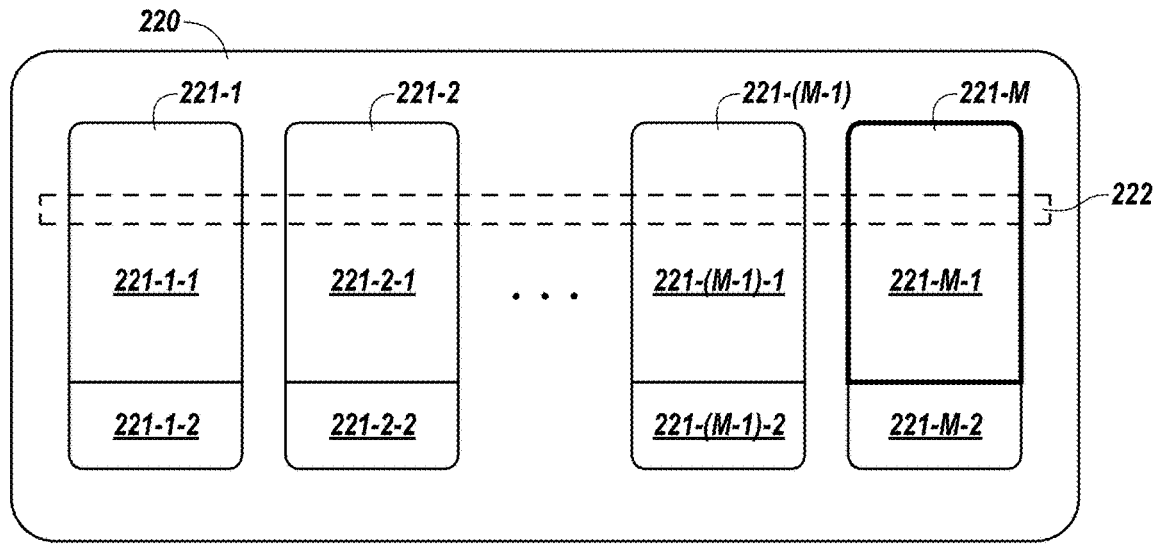
FIG. 2 illustrates an example memory die comprising memory banks configured for storing error correction/detection data in accordance with a number of embodiments of the present disclosure.
FIG. 3 illustrates an example of how error correction/detection data can be spread among memory banks in accordance with a number of embodiments of the present disclosure.

FIG. 2 illustrates an example memory die 220 comprising memory banks 221-1, . . . , 221-M configured for storing error correction/detection data in accordance with a number of embodiments of the present disclosure. The memory banks 221 are analogous to memory bank 121 illustrated/described in connection with FIG. 1. The memory banks 221 can be those memory banks coupled to a same channel and included within a single memory die, such as the memory die 220220. The memory die 220220 can be a DRAM die and memory banks 221 can include DRAM cells.

The memory banks 221-1, . . . , 221-(M−1) can be configured to store host data (e.g., data received from the system controller 110 illustrated in FIG. 1) in respective locations, such as in respective portions 221-1-1, . . . , 221-(M−1)-1. In some embodiments, respective portions 221-1-1, . . . , 221-(M−1)-1 of the memory banks 221-1, . . . , 221-(M−1) can further include error correction data for correcting a quantity of errors equal to or not exceeding a threshold quantity within a respective one of the memory banks 221-1, . . . , 221-(M−1). For example, a quantity of errors equal to or not exceeding the threshold quantity within the memory bank 221-1 can be corrected using the error correction data stored in the portion 221-1-1.

The memory banks 221 can be configured to store error detection data in their respective portions 221-1-2, . . . , 221-M-2. Although embodiments are not so limited, the error detection data can be CRC data. The error detection data (e.g., CRC) can be utilized for indication of a quantity of errors exceeding a threshold quantity within a page (e.g., a row of memory cells) respective one of the memory banks 221. For example, an error detection operation performed using the error detection data stored in the portion 221-1-2 can indicate whether a page of the memory bank 221-1 still suffers from errors even subsequent to the error correction operation performed using the error correction data stored in the portion 221-1-1. That the error detection operation indicates that there still exists errors within the memory bank 221-1 further indicates that the memory bank 221-1 originally included a quantity of errors exceeding a threshold quantity within the memory bank 221-1.

The memory bank 221-M can be configured to store error correction data in its portion 221-M-1 for correcting a quantity of errors exceeding a threshold quantity (e.g., within a respective one of the memory banks 221-1, . . . , 221-(M−1)) that were not correctable using the error correction data stored in a respective one of the portions 221-1-1, . . . , 221-(M−1)-1. In some embodiments, the error correction data for correcting a quantity of errors exceeding a threshold quantity can be parity data (e.g., RAID parity).

Performing an error correction operation using the error correction data (e.g., parity data) that can be stored in the memory bank 221-M involves reading the error correction data from the memory bank 221-M as well as other host data stored in the memory banks 221-1, . . . , 221-(M−1) (e.g., other than host data stored in a particular memory bank indicated as having the quantity or errors). For example, if it is determined that host data (e.g., data stored in a page of a respective memory bank) read from the memory bank 221-1 still contains errors that are uncorrectable by the error correction operation performed using error correction data stored in the portion 221-1-1 of the memory bank 221-1, the data stored in the memory bank 221-1 can be recovered by reading error correction data stored in the memory bank 221-M along with other corresponding host data from the memory banks 221-2, . . . , 221-(M−1). For instance, an XOR of the data read from the "good" memory banks 221-2, . . . , 221-(M−1) and the error correction data read from the memory bank 221-M can be used to correct (e.g., recover) the erroneous data read from memory bank 221-1.

FIG. 2 illustrates a stripe 222 (e.g., parity stripe) that spans the memory banks 221-1, . . . , 221-M. For example, the stripe 222 can include/correspond to data stored in one or more rows of memory cells of each one of memory banks 221-1, . . . , 221-M. The one or more rows within each one of the memory banks corresponding to a same stripe (e.g., stripe 222) can be referred to as a "strip." An error correction operation (e.g., performed using parity data) described herein can be performed in a unit of a stripe (e.g., stripe 222). For example, the error correction data stored in the memory bank 221-M and corresponding to a particular stripe (e.g., stripe 222) correspond to error correction data that were previously generated based on host data corresponding to the same stripe. Therefore, an error correction operation to correct a quantity of errors exceeding a threshold quantity involves reading error correction data of the stripe as well as host data (good data) of the stripe. In some embodiments, a strip can correspond to data stored in a single row (e.g., a single DRAM page) of memory cells of a respective one of memory banks.

In some embodiments, the memory banks 221 can be DRAM banks and include DRAM cells. In this example, in contrast to NAND whose erase operations are performed in a unit of a block (while write operations are performed in a unit of a page), read and write operations can be performed on the memory banks 221 independently of erase operations. For example, in NAND memory devices, a block typically stores pages of data corresponding to multiple stripes. Therefore, even updating data corresponding one of the stripes and stored in a single page of the block requires whole pages of the block to be erased, which will further require rewriting data corresponding to the other stripes of the block. On the other hand, updating constituent host data (corresponding to one of strips of a stripe) according to DRAM banks (e.g., memory banks 221) does not require rewriting host data corresponding to the other strips of the stripe and/or other stripes.

Assuming that the memory die 220 includes 64 memory banks (e.g., memory banks 221), an example illustrated in FIG. 2 can have a parity overhead of approximately 1.58% (1/63). For example, a ratio of a quantity of memory banks (e.g., memory bank 221-M) configured for storing error correction data for correcting a quantity of errors exceeding a threshold quantity to a quantity of banks (e.g., 221-1, . . . , 221-(M−1)) configured for storing host data is 1/63.

In some embodiments, error detection data can be stored in a single row (e.g., a single DRAM page) of memory cells (of a respective one of portions 221-1-2, . . . , 221-M-2). In this example, error detection data stored in a single row of memory cells (which may be a unit of a single read operation for a DRAM array) can be used to perform an error detection operation on data corresponding to any one of multiple stripes (of a respective one of portions 221-1-1, . . . , 221-M-1). Accordingly, reading data corresponding to multiple stripes from a same memory bank in accordance with the embodiments illustrated in connection with FIG. 2 (as well as in connection with FIG. 3-6) involves reading error detection data from the same memory bank no more than once (a single read operation can be performed to read the error detection data for multiple read operations performed to read the data corresponding to multiple stripes) as compared to those approaches in which respective error correction/detection data for multiple stripes are stored in separate locations, which requires performing multiple read operations for reading the error correction/detection data from each one of the locations.

Although embodiments are not so limited, a threshold quantity described herein can correspond to a single error. For example, in an embodiment illustrated in FIG. 2, error correction data stored in the portions 221-1-1, . . . , 221-M-1 can correct a single error, while error correction data stored in the memory bank 221-M can correct multiple errors (e.g., more than a single error) within one or more memory banks 221-1, . . . , 221-(M−1).

The operational role of the memory banks (e.g., memory banks 221) can be occasionally/periodically swapped to balance a quantity of accesses across the memory banks and to avoid a "hot spot" and prevent one memory bank from being accessed more frequently than the other memory banks. For example, it was previously described that the memory banks 221-1, . . . , 221-(M−1) are configured to store host data, while the memory bank 221-M is configured to store error correction data (e.g., parity data). To avoid the memory banks 221-1, . . . , 221-(M−1) from being accessed more frequently than the memory bank 221-M (because host data are likely to be accessed more frequently than multi-channel error-correction data), at some point, one of the memory banks 221-1, . . . , 221-(M−1) can be reconfigured to store the error correction data, while the memory bank 221-M can be reconfigured to store host data.

In a non-limiting example, an example apparatus (e.g., the computing system 100 or the memory device 120 illustrated in FIG. 1) can include a first group of memory banks (e.g., memory banks 221-1, . . . , 221-(M−1)) of a memory die (e.g., memory die 220). The first group of memory banks can include a first portion (e.g., portions 221-1-1, . . . , 221-(M−1)-1) configured for host data and a second portion (e.g., portions 221-1-2, . . . , 221-M-2) configured for error detection data for indication of a quantity of errors exceeding a threshold quantity within a respective one of the first group of memory banks. The apparatus can further include a second group of memory banks (e.g., memory bank 221-M) of the memory die configured for error correction data to correct a quantity of errors exceeding the threshold quantity within a respective one of the first group of memory banks. In some embodiments, the error detection data includes cyclic redundancy check (CRC) data. Further, the first group of memory banks and the second group of memory banks can include dynamic random access memory (DRAM) cells.

In some embodiments, the memory die can include a plurality of groups of stripes (e.g., stripe 222). Each one of the plurality of groups of stripes can include a respective group of rows of memory cells from each one of the first and the second groups of memory banks. In this example, the apparatus can further include control circuitry (e.g., control circuitry 140 illustrated in FIG. 1) coupled to the first group of memory banks and the second group of memory banks of the memory die. The control circuitry can be configured to read the host data from the first portion of one of the first group of memory banks and corresponding to one of the plurality of stripes and perform an error detection operation on the read host data using the error detection data stored in the second portion of the one of the first group of memory banks. The control circuitry can be further configured to, responsive to the error detection operation indicating a quantity of errors exceeding the threshold quantity within the one of the first group of memory banks, perform an error correction operation using at least the error correction data stored in the second group of memory banks and corresponding to one of the plurality of stripes.

Continuing with the above example, the control circuitry can be further configured to, prior to the performance of the error detection operation on the portion of the host data using the error detection data stored in the one of the first group of memory banks, perform an error correction operation on the one of the first group of memory banks using error correction data stored in the first portion of the one of the first group of memory banks to correct a quantity of errors equal to or not exceeding the threshold quantity within the one of the first group of memory banks.

FIG. 3 illustrates an example of how error correction/detection data can be spread among memory banks 321-1, . . . , 321-8 320 in accordance with a number of embodiments of the present disclosure. Memory banks 321 illustrated in FIG. 3 are analogous to memory banks 121/221 illustrated in FIGS. 1 and 2, respectively. For example, the memory banks 321 can be those memory banks coupled to a same channel and include DRAM cells. Although not illustrated in FIG. 3, each memory bank 321 can further store error detection data (e.g., CRC) for indication of a quantity of errors exceeding a threshold quantity, such as a single error. Although FIG. 3 illustrates eight banks, embodiments are not limited to a particular quantity of memory banks a single memory die can include.

As illustrated in FIG. 3, the memory banks 321 can be further divided into regions. As used herein, the term "region" refers to groups of groups of rows of memory cells rows of memory cells across multiple memory banks. For example, as illustrated in FIG. 3, groups of rows of memory cells 325-1-1, . . . , 325-8-1 respectively from memory banks 321-1, . . . , 321-8 can be referred to as a region 323-1; groups of rows of memory cells 325-1-2, . . . , 325-8-2 respectively from memory banks 321-1, . . . , 321-8 can be referred to as a region 323-2; groups of rows of memory cells 325-1-3, . . . , 325-8-3 respectively from memory banks 321-1, . . . , 321-8 can be referred to as a region 323-3; groups of rows of memory cells 325-1-4, . . . , 325-8-4 respectively from memory banks 321-1, . . . , 321-8 can be referred to as a region 323-4; groups of rows of memory cells 325-1-5, . . . , 325-8-5 respectively from memory banks 321-1, . . . , 321-8 can be referred to as a region 323-5; groups of rows of memory cells 325-1-6, . . . , 325-8-6 respectively from memory banks 321-1, . . . , 321-8 can be referred to as a region 323-6; groups of rows of memory cells 325-1-7, . . . , 325-8-7 respectively from memory banks 321-1, . . . , 321-8 can be referred to as a region 323-7; and groups of rows of memory cells 325-1-8, . . . , 325-8-8 respectively from memory banks 321-1, . . . , 321-8 can be referred to as a region 323-8.

Error correction data for correcting a quantity of errors exceeding a threshold are distributed evenly across the memory banks 321 such that each region 323 can store the error correction data within only one of the memory banks 321. For example, as illustrated in FIG. 3, the region 323-1 stores the error correction data within the memory bank 321-8 (e.g., group of rows of memory cells 325-1-8); the region 323-2 stores the error correction data within the memory bank 321-7 (e.g., group of rows of memory cells 325-2-7); the region 323-3 stores the error correction data within the memory bank 321-6 (e.g., group of rows of memory cells 325-3-6); the region 323-4 stores the error correction data within the memory bank 321-5 (e.g., group of rows of memory cells 325-4-5); the region 323-5 stores the error correction data within the memory bank 321-4 (e.g., group of rows of memory cells 325-5-4); the region 323-6 stores the error correction data within the memory bank 321-3 (e.g., group of rows of memory cells 325-6-3); the region 323-7 stores the error correction data within the memory bank 321-2 (e.g., group of rows of memory cells 325-7-2); and the region 323-8 stores the error correction data within the memory bank 321-1 (e.g., group of rows of memory cells 325-8-1). In contrast to the example illustrated in FIG. 2 where error correction data are stored in only one of the memory banks 221 (e.g., memory bank 221-M), distributing error correction data evenly across the memory banks 321 can balance a quantity of accesses across the memory banks 321 to avoid a "hot spot" by preventing one memory bank from being accessed more frequently than the other memory banks.

An error correction operation to correct a quantity of errors exceeding a threshold quantity, such as a single error, can be performed using error correction data (e.g., parity data) stored in one of the banks 321 of each region 323 in a unit of stripe, as described in connection with FIG. 2. For example, if it is determined that host data read from a row of memory cells of the group 325-1-1 of the memory bank 321-1 and corresponding to a particular stripe contains a quantity of errors exceeding a threshold quantity (that were uncorrectable from an error correction operation previously performed to correct a quantity of errors equal to or not exceeding a threshold quantity), the data can be recovered by reading error correction data stored in a corresponding row (corresponding to the same stripe with the row of memory cells of the group 325-1-1) of the group of memory cells 325-8-1 of the memory bank 321-8 along with other host data from a respective row (corresponding to the same stripe with the row of memory cells of the group of rows of memory cells 325-1-1) of memory cells of each one of the groups of rows memory cells 325-2-1, . . . , 325-7-1 of the memory banks 321-2, . . . , 321-7. Although embodiments are not so limited, a threshold quantity described herein can correspond to a single error.

As also described in connection with FIG. 2, the operational role of memory banks (e.g., memory banks 321) in relation to regions (e.g., regions 323) can be occasionally/periodically swapped to balance a quantity of accesses across the memory banks and to avoid a "hot spot" and prevent one memory location (e.g., region) from being accessed more frequently than the other memory locations (e.g., regions). For example, one of a group of rows of memory cells of a memory bank that is configured to store error correction data for a particular region can be reconfigured to store host data, while a group of rows of memory cells of a different memory bank (that is configured to store host data) can be reconfigured to store error correction data (to correct a quantity of errors exceeding a threshold quantity) for the particular region.

Figure 4:
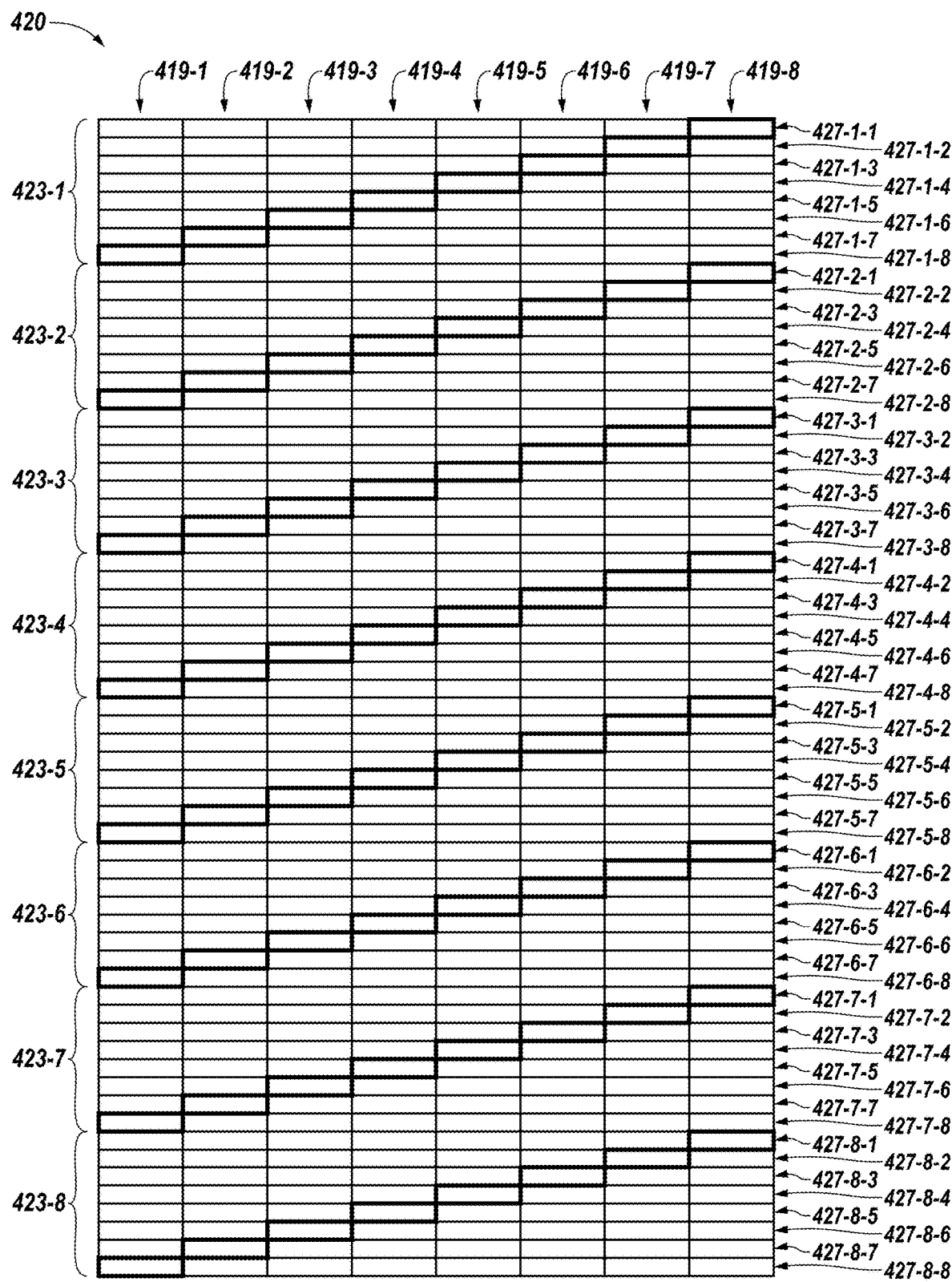
FIG. 4 illustrates an example of how error correction/detection data can be spread among memory banks in accordance with a number of embodiments of the present disclosure.

FIG. 4 illustrates an example of how error correction/detection data can be spread among memory banks 421 of a memory die 420 with error correction/detection data in relation to sub-regions 427 in accordance with a number of embodiments of the present disclosure. The memory banks 421 and regions 423 illustrated in FIG. 4 are respectively analogous to memory banks 321 and regions 323 illustrated in FIG. 2, respectively. For example, the memory banks 421 can be those memory banks coupled to a same channel and include DRAM cells. Although not illustrated in FIG. 4, each memory bank 421 can further store error detection data (e.g., CRC) for indication of a quantity of errors exceeding a threshold quantity, such as a single error, within respective memory banks 421. Although FIG. 4 illustrates eight banks and regions, embodiments are not limited to a particular quantity of memory banks/regions a single memory die can include.

As illustrated in FIG. 4, the regions 423 can be further divided into sub-regions. For example, as illustrated in FIG. 4, one or more rows of memory cells from each one of the memory banks 421 and within the region 423-1 can constitute a respective one of sub-regions 427-1-1, . . . , 427-1-8; one or more rows of memory cells from each one of the memory banks 421 and within the region 423-2 can constitute a respective one of sub-regions 427-2-1, . . . , 427-2-8; one or more rows of memory cells from each one of the memory banks 421 and within the region 423-3 can constitute a respective one of sub-regions 427-3-1, . . . , 427-3-8; one or more rows of memory cells from each one of the memory banks 421 and within the region 423-4 can constitute a respective one of sub-regions 427-4-1, . . . , 427-4-8; one or more rows of memory cells from each one of the memory banks 421 and within the region 423-5 can constitute a respective one of sub-regions 427-5-1, . . . , 427-5-8; one or more rows of memory cells from each one of the memory banks 421 and within the region 423-6 can constitute a respective one of sub-regions 427-6-1, . . . , 427-6-8; one or more rows of memory cells from each one of the memory banks 421 and within the region 423-7 can constitute a respective one of sub-regions 427-7-1, . . . , 427-7-8; and one or more rows of memory cells from each one of the memory banks 421 and within the region 423-8 can constitute a respective one of sub-regions 427-8-1, . . . , 427-8-8.

Error correction data (e.g., parity data) for correcting a quantity of errors exceeding a threshold can be distributed evenly across the memory banks 421 as well as across the regions 423 such that each sub-region 427 can include the error correction data within only one of the memory banks 421. For example, as illustrated in FIG. 4, the sub-region 427-1-1 stores the error correction data within the memory bank 421-8; the sub-region 427-1-2 stores the error correction data within the memory bank 421-7; the sub-region 427-1-3 stores the error correction data within the memory bank 421-6; the sub-region 427-1-4 stores the error correction data within the memory bank 421-5; the sub-region 427-1-5 stores the error correction data within the memory bank 421-4; the sub-region 427-1-6 stores the error correction data within the memory bank 421-3; the sub-region 427-1-7 stores the error correction data within the memory bank 421-2; and the sub-region 427-1-8 stores the error correction data within the memory bank 421-1.

An error correction operation to correct a quantity of errors exceeding a threshold quantity, such as a single error, can be performed using error correction data (e.g., parity data) stored in one of the banks 421 of each sub-region 427 in a unit of stripe, as described in connection with FIG. 2. For example, if it is determined that host data read from a row of memory cells of the sub-region 427-1-1 of the memory bank 421-1 and corresponding to a particular stripe contains a quantity of errors exceeding a threshold quantity (that were uncorrectable from an error correction operation previously performed to correct a quantity of errors equal to or not exceeding a threshold quantity), the data stored in the row of memory cells of the group of rows of memory cells 427-1-1 can be recovered by reading error correction data stored in a row of memory cells of the sub-region 427-1-8 of the memory bank 421-8 along with other host data from a respective row of memory cells of each one of the sub-regions 427-1-2, . . . , 427-1-7 of the memory banks 421-2, . . . , 421-7 and corresponding to the same stripe. Although embodiments are not so limited, a threshold quantity described herein can correspond to a single error.

As described in connection with FIGS. 2 and 3, the operational role of memory banks (e.g., memory banks 421) in relation to sub-regions (e.g., sub-regions 427) can be occasionally/periodically swapped to balance a quantity of accesses across the memory banks and to avoid a "hot spot" and prevent one memory location (e.g., sub-region) from being accessed more frequently than the other memory locations. For example, one of a group of rows of memory cells of a memory bank that is configured to store error correction data for a particular sub-region can be reconfigured to store host data, while a group of rows of memory cells of a different memory bank (that is configured to store host data) can be reconfigured to store error correction data for the particular sub-region.

In a non-limiting example, an example system (e.g., the computing system 100 or the memory device 120 illustrated in FIG. 1) can include a group of memory banks (e.g., memory banks 321/421 illustrated in FIGS. 3 and 4, respectively) of a memory die (e.g., memory dice 320/420 illustrated in FIGS. 3 and 4, respectively). Each one of the memory banks of the memory die can include a first portion configured for storing error correction data to correct a quantity of errors exceeding a threshold quantity within a respective memory bank and a second portion configured for storing error detection data for indicating a quantity of errors exceeding the threshold quantity within the respective one of the group of memory banks. The group of memory banks can be coupled to a same channel.

In some embodiments, the memory die is a DRAM die. In this example, the second portion corresponds to a row of DRAM memory cells of a respective one of the group of memory banks. In some embodiments, each one of the group of memory banks of the memory die can further include a third portion configured for storing host data used to generate the error correction data stored in the first portions of the group of memory banks.

In some embodiments, the error correction data can include a plurality of portions of the error correction data that are distributed evenly across the group of memory banks such that each portion of the plurality of portions of the error correction data is stored in a different bank and different rows of memory cells of the group of memory banks than the other portions of the plurality of portions of the error correction data (e.g., groups of rows of memory cells 325-8-1, 325-7-2, 325-6-3, 325-5-4, 325-4-5, 325-3-6, 325-2-7, and 325-1-8). In some embodiments, the error correction data comprises parity data.

Figure 5:
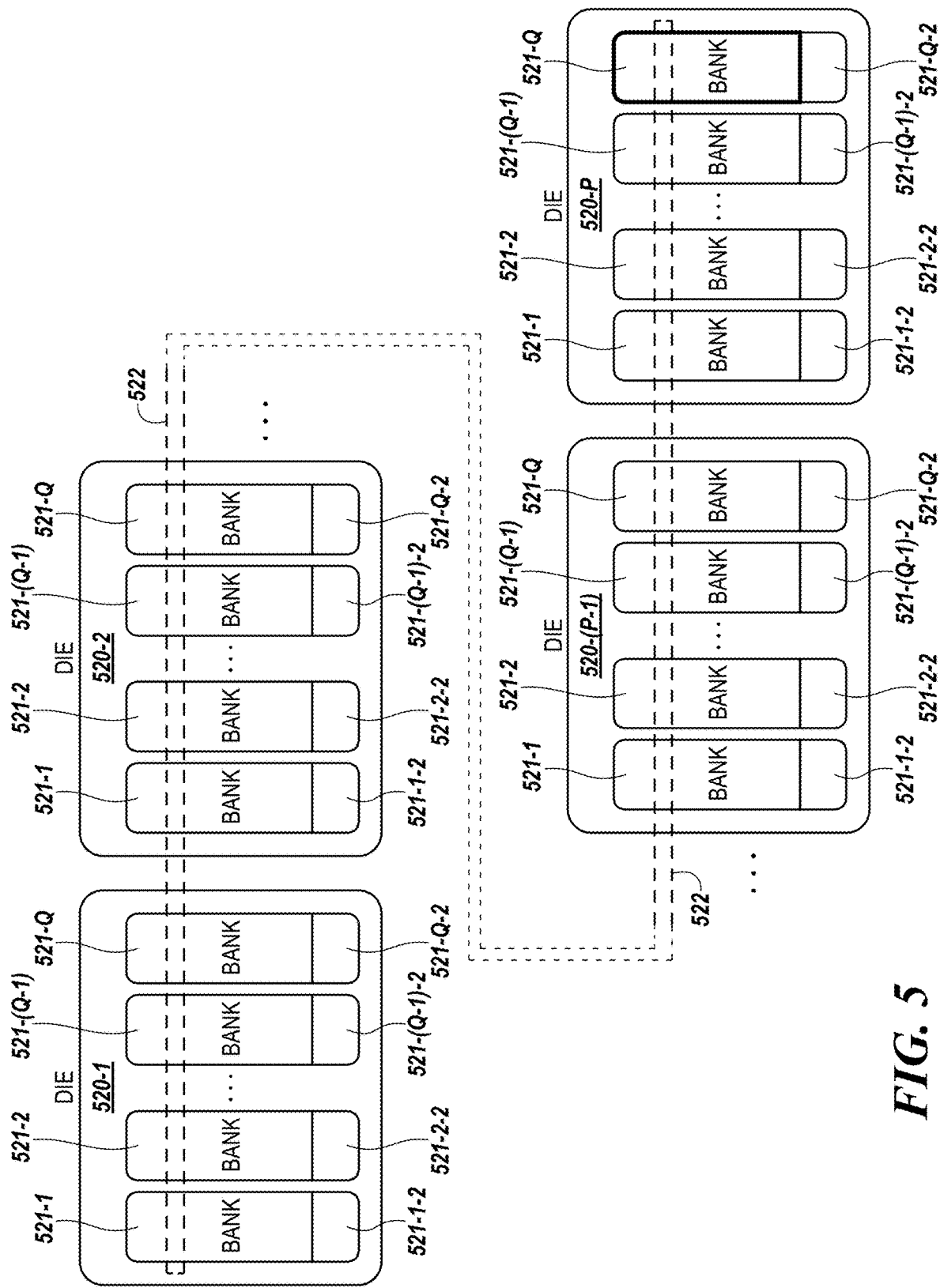
FIG. 5 illustrates example memory bank protection scheme in which the error correction/detection data spans across multiple memory dice in accordance with a number of embodiments of the present disclosure.

In some embodiments, the memory die comprises a plurality of groups of stripes (e.g., stripes 222/522 illustrated in FIGS. 2 and 5, respectively). Each one of the plurality of groups of stripes can include a respective group of rows of memory cells from each one of the first and the second groups of memory banks. Further, the plurality of groups of stripes can store respective portions of the error correction data in locations corresponding to different memory banks of the first and the second group of memory banks.

In some embodiments, the system can further include control circuitry (e.g., control circuitry 140 illustrated in FIG. 1) coupled to the group of memory banks. The control circuitry can be configured to perform, using the error detection data stored in one of the group of memory banks, an error detection operation on the one of the group of memory banks for indication of a quantity of errors exceeding the threshold quantity within the one of the group of memory banks. The control circuitry can be further configured to perform, responsive to the error detection operation indicating the quantity of errors exceeding the threshold quantity within the one of the group of memory banks, a read operation on the group of memory banks to retrieve the error correction data stored in the first portion of each one of the group of memory banks. The control circuitry can be further configured to perform an error correction operation using the error correction data retrieved from the first portion of each one of the group of memory banks to correct the quantity of errors exceeding the threshold quantity within the one of the group of memory banks.

FIG. 5 illustrates example memory bank protection scheme in which the error correction/detection data spans across multiple memory dice 520-1, . . . , 520-P in accordance with a number of embodiments of the present disclosure. The memory dice 520 are analogous to memory die 220, 320, and/or 420 illustrated in connection with FIGS. 2, 3, and 4, respectively. For example, the memory dice 520 each can be a DRAM die. The memory banks 521 can include DRAM cells. The memory dice 520 can be coupled to different channels. Further, the memory banks 521 are analogous to memory banks 221, 321, and/or 421 illustrated in connection with FIGS. 2, 3, and 4, respectively. The memory banks 521 can include DRAM cells. Error correction/detection operation described in connection with FIG. 5 can be performed by a system controller, such as the system controller 110 illustrated in connection with FIG. 1.

The memory banks 521-1, . . . , 521-Q of the memory dice 520-1, . . . , 520-(P−1) as well as the memory banks 521-1, . . . , 521-(Q−1) of the memory die 520-P can store host data (e.g., data received from the hot 110 illustrated in FIG. 1) in respective locations, such as in respective portions 521-1-1, . . . , 521-Q-1 of the memory banks 521-1, . . . , 521-Q of the memory dice 520-1, . . . , 520-(P−1) and/or in portions 521-1-1, . . . , 521-(Q−1)-1 of the memory banks 521-1, . . . , 521-(Q−1) of the memory die 520-P. In some embodiments, respective portions 521-1-1, . . . , 521-Q-1 of the memory banks 521-1, . . . , 521-Q of the memory dice 520-1, . . . , 520-(P−1) and/or respective portions 521-1-1, . . . , 521-(Q−1)-1 of the memory banks 521-1, . . . , 521-(Q−1) of the memory die 520-P can further include error correction data for correcting a quantity of errors equal to or not exceeding a threshold quantity within a respective one of the memory banks 521.

Each memory bank 521 can store error detection data in their respective portions 521-1-2, . . . , 521-Q-2. Although embodiments are not so limited, the error detection data can include CRC data. The error detection data (e.g., CRC) can be utilized for indication of a quantity of errors exceeding a threshold quantity within a respective one of the memory banks 521. For example, if the memory bank 521-1 of the memory die 520-1 still suffers from errors even subsequent to the error correction operation performed using the error correction data stored in the portion 521-1-1 of the memory bank 521-1 of the memory die 520-1, an error detection operation performed using the error detection data stored in the portion 521-1-2 of the memory die 520-1 can indicate that there are still errors within the memory bank 521-1 of the memory die 520-1. In some embodiments, each portion 521-1-2, . . . , 221-Q-2 of each memory die 520-1, . . . , 520-P can correspond to a single row of memory cells.

The memory bank 521-Q of the memory die 520-P can include error correction data in its portion 221-Q-1 for correcting a quantity of errors exceeding a threshold quantity (e.g., within a respective one of the memory banks 521-1, . . . , 521-Q of the memory dice 520-1, . . . , 520-(P−1) and/or memory banks 521-1, . . . , 521-(Q−1) of the memory die 520-P) that were uncorrectable using the error correction data stored in a respective one of the portions 521-1-1, . . . , 521-Q-1 of the memory dice 520-1, . . . , 520-(P−1) and/or the portions 521-1-1, . . . , 521-(Q−1)-1 of the memory die 520-P. In some embodiments, the error correction data for correcting a quantity of errors exceeding a threshold quantity can be parity data. Although embodiments are not so limited, a threshold quantity described herein can correspond to a single error.

A stripe can include data stored in one or more rows of memory cells (e.g., strip) of each one of memory banks 521-1, . . . , 521-Q of memory dice 520-1, . . . , 520-P. For example, the stripe 522 can include/correspond to host data stored in one or more rows of memory cells of the memory banks 521-1, . . . , 521-Q of memory dice 520-1, . . . , 520-(P−1) and of the memory banks 521-1, . . . , 521-(Q−1) of memory die 520-P as well as error correction data stored in one or more rows of memory cells of the memory bank 521-Q of memory die 520-P, as illustrated in FIG. 5. Accordingly, an error correction operation (to correct a quantity of errors exceeding a threshold quantity) can be performed on host data stored in one of strips of the stripe 522 by reading error correction data of the stripe 522 (of the memory bank 521-Q of memory die 520-P) as well as host data of the other strips of the stripe 522.

The operational role of the memory banks/dice (e.g., memory banks 521 and/or memory dice 520) can be occasionally/periodically swapped to balance a quantity of accesses across the memory banks and to avoid a "hot spot" and prevent one memory bank from being accessed more frequently than the other memory banks/dice. For example, it was previously described that the memory bank 521-Q of the memory die 520-P is configured to store error correction data (e.g., parity data), while the other memory banks 521 are configured to store hot data. Accordingly, at some point, one of the memory banks 521 of memory dice 520-1, . . . , 520-(P−1) and the memory banks 521-1, . . . , 521-(Q−1) can be reconfigured to store the error correction data, while the memory bank 521-Q of memory die 520-P is reconfigured to store host data.

Assuming that each one of the memory die 520 includes 64 memory banks (e.g., memory banks 521), an example illustrated in FIG. 5 can have an overhead of approximately 0.048%. For example, a ratio of a quantity of memory banks (e.g., memory bank 521-Q of the memory die 520-P) configured for storing error correction data for correcting a quantity of errors exceeding a threshold quantity to a quantity of banks (e.g., memory banks 521-1, . . . , 521-Q of the memory dice 520-1, . . . , 520-(P−1) as well as memory banks 521-1, . . . , 521-(Q−1) of the memory die 520-P) configured for storing host data is $\frac{1}{2047}$ (approximately 0.048%).

In a non-limiting example, an example system (e.g., the computing system 100 or the memory device 120 illustrated in FIG. 1) can include a first number of memory dice (e.g., memory dice 520-1, . . . , 520-(P−1)) of a group of memory dice (e.g., memory dice 520). Each one of the first group of memory dice can include a plurality of memory banks (e.g., memory banks 521-1, . . . , 521-Q) and each one of the plurality of memory banks can include a first portion (e.g., portions 521-1-1, . . . , 521-Q-1) configured to store host data and a second portion (e.g., portions 521-1-2, . . . , 521-Q-2) configured to store error detection data for indication of a quantity of errors exceeding a threshold quantity within a respective one of the plurality of memory banks. The system can further include a second memory die of the group of memory dice (e.g., memory die 520-P). The second memory die can include a plurality of memory banks (e.g., memory banks 521-1, . . . , 521-Q). One of the plurality of memory banks (e.g., memory bank 521-Q) can be configured to store error correction data to correct a quantity of errors exceeding the threshold quantity within the plurality of memory banks of the first number of memory dice and the second die.

In some embodiments, the other memory banks (e.g., memory banks 521-1, . . . , 521-(Q−1)) of the plurality of memory banks of the second memory die can be configured to store host data. In some embodiments, memory dice of the first number of memory dice and the second memory die can be coupled to different channels. In some embodiments, each one of the plurality of memory banks of the second memory die can be configured to store error detection data for indication of a quantity of errors exceeding a threshold quantity within a respective one of the plurality of banks of the second memory die.

FIG. 6 is a flow diagram representing an example method 631 for memory bank protection in accordance with a number of embodiments of the present disclosure. The method 631 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 631 is performed by the control circuitry 140 and/or the system controller 110 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 632, the method 631 can include performing a read operation on a bank of a group of memory banks (e.g., memory banks 221, 321, 421, and/or 521 illustrated in connection with FIGS. 2 to 5, respectively) of a Memory die (e.g., memory die 220, 320, 420, and/or 520 illustrated in connection with FIGS. 2 to 5, respectively) to retrieve first host data from a page of memory cells of the bank of the group of memory banks and error detection data from a different page of Memory cells of the bank of the group.

At block 634, the method 631 can include performing an error detection operation on the first host data retrieved from the page of memory cells of the bank of the group using the error detection data. In some embodiments, the method 631 can include, prior to performing the error detection operation on the host data retrieved from the page of memory cells of the bank of the group, performing an error correction operation on the host data retrieved from the page of memory cells of the bank of the group using error correction data stored in the bank of the group to correct a quantity of errors equal to or not exceeding the threshold quantity.

At block 636, the method 631 can include, responsive to indication of a quantity of errors exceeding a threshold quantity within the first host data via the error detection operation, reading second host data from corresponding pages of Memory cells of other banks of the group and error correction data stored in at least one of the group; and At block 638, the method 631 can include performing an error correction operation using the second host data retrieved from the corresponding pages of memory cells of the other banks and the error correction data retrieved from the at least one of the group to correct the quantity of errors exceeding the threshold quantity.

In some embodiments, the method 631 can include receiving a write request to write different host data on the page of memory cells of the bank of the group. In this example, the method 631 can further include writing the different host data to the page of the Memory cells without erasing other pages of memory cells of the bank of the group.

In some embodiments, the method 631 can include, responsive to receiving the write request, generating error correction data based on the different host data and the second hot data. In this example, the method 631 can further include writing the generated error correction data to the at least one of the group.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a first group of memory banks of a memory device, the first group of memory banks comprising:
      a first portion configured to store host data; and
      a second portion configured to store error detection data for indication of a quantity of errors within a respective one of the first group of memory banks and exceeding a threshold quantity; and
   a second group of memory banks of the memory device, the second group of memory banks configured to store error correction data corresponding to parity data to correct a quantity of errors within a respective one of the first group of memory banks and exceeding the threshold quantity.

2. The apparatus of claim 1, wherein the memory device comprises a plurality of groups of stripes, each one of the plurality of groups of stripes comprises a respective group of memory cells from each one of the first and the second groups of memory banks.

3. The apparatus of claim 2, wherein:
   a memory bank of the second group of memory banks is configured to store error correction data corresponding to a first stripe; and
   a different memory bank of the second group of memory banks is configured to store error correction data corresponding to a second stripe.

4. The apparatus of claim 2, wherein:
   a first group of memory cells are distributed over the first group of memory banks and the second group of memory banks, the first group of memory cells configured to store data corresponding to the first stripe; and
   a second group of memory cells are distributed over the first group of memory banks and the second group of memory banks, the second group of memory cells configured to store data corresponding to the second stripe.

5. The apparatus of claim 1, wherein the memory device corresponds to a memory die.

6. An apparatus, comprising:
a group of memory banks configured to store data corresponding to a first stripe, wherein the first stripe further comprises:
a first portion of the group of memory banks configured to store first host data; and
a second portion of the group of memory banks configured to store first error correction data to correct a quantity of errors within the first host data; and
the group of memory banks further configured to store data corresponding to a second stripe, wherein the second stripe further comprises:
a third portion of the group of memory banks configured to store second host data; and
a fourth portion of the group of memory banks configured to store second error correction data.

7. The apparatus of claim 6, wherein:
the second portion of the group of memory banks corresponds to a first bank of the group of memory banks; and
the fourth portion of the group of memory banks corresponds to a second bank of the group of memory banks.

8. The apparatus of claim 6, wherein:
the second portion of the group of memory banks further comprises a plurality of portions distributed over the group of memory banks, the plurality of portions configured to store the first error correction data.

9. The apparatus of claim 8, wherein the plurality of portions respectively corresponds to different memory banks of the group of memory banks.

10. The apparatus of claim 8, wherein the plurality of portions respectively corresponds to different groups of memory cells of the group of memory banks.

11. The apparatus of claim 10, wherein each one of the plurality of portions corresponds to a row of DRAM memory cells.

12. The apparatus of claim 6, further comprising control circuitry coupled to the group of memory banks, the control circuitry configured to:
perform an error detection operation on the first host data using first error detection data; and
responsive to the error detection operation indicating a quantity of errors within the first host data and exceeding a threshold quantity, performing an error correction operation using:
the first error correction data to correct the quantity of errors exceeding the threshold quantity; and
third host data corresponding to the first stripe.

13. The apparatus of claim 12, wherein the control circuitry is configured to perform a read operation on the first portion of the group of memory banks to retrieve the first error detection data.

14. A method, comprising:
performing an error detection operation on first host data retrieved from a first bank of a group of memory banks using first error detection data; and
responsive to the error detection operation indicating a quantity of errors within the first host data and exceeding a threshold quantity, performing an error correction operation using:
first error correction data to correct the quantity of errors exceeding the threshold quantity; and
second host data that are retrieved from one or more banks of the group of memory banks that is different from the first bank.

15. The method of claim 14, further comprising, prior to performing the error correction operation, performing a read operation on the one or more banks of the group of memory banks to retrieve:
the second host data from a second bank of the group of memory banks; and
the first error correction data from a third bank of the group of memory banks.

16. The method of claim 14, further comprising:
performing an error detection operation on third host data retrieved from the first bank of a group of memory banks using second error detection data; and
responsive to the error detection operation indicating a quantity of errors within the third host data and exceeding a threshold quantity, performing an error correction operation using:
second error correction data to correct the quantity of errors exceeding the threshold quantity; and
fourth host data that are retrieved from one or more banks of the group of memory banks that is different from the first bank.

17. The method of claim 16, further comprising:
performing a read operation on a first group of memory cells of the first bank to retrieve the first host data prior to performing the error detection operation on the first host data; and
performing a read operation on a second group of memory cells of the first bank to retrieve the first host data prior to performing the error detection operation on the first host data.

18. The method of claim 17, further comprising performing a read operation on the first group of memory cells of one or more banks to retrieve the second host data or the first error correction data prior to performing the error detection operation on the first host data.

19. The method of claim 17, further comprising performing a read operation on the second group of memory cells of the one or more banks to retrieve the fourth host data or the second error correction data prior to performing the error detection operation on the third host data.

* * * * *